United States Patent
Morimoto et al.

(10) Patent No.: US 6,348,771 B1
(45) Date of Patent: Feb. 19, 2002

(54) MOTOR DRIVE CONTROLLER FOR VEHICLE

(75) Inventors: Kazuhiko Morimoto; Yoshiaki Omata, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/539,000

(22) Filed: Mar. 30, 2000

(30) Foreign Application Priority Data

Mar. 31, 1999 (JP) .......................... 11-092617

(51) Int. Cl.[7] ................................ H02P 1/00
(52) U.S. Cl. ............. 318/139; 180/65.1; 180/65.3; 477/7; 318/376; 318/432; 318/366
(58) Field of Search ............... 318/139, 376, 318/432, 366; 180/65.1, 65.2, 65.3, 65.4, 165; 477/7, 129

(56) References Cited

U.S. PATENT DOCUMENTS

| | | | |
|---|---|---|---|
| 4,531,491 A | * 7/1985 | Iiyama et al. | 123/357 |
| 4,589,071 A | * 5/1986 | Yamamuro et al. | 364/424.1 |
| 4,653,621 A | * 3/1987 | Oshiage | 192/0.032 |
| 5,172,784 A | * 12/1992 | Varela, Jr. | 180/65.4 |
| 5,343,970 A | 9/1994 | Severinsky | 180/65.2 |
| 5,495,906 A | * 3/1996 | Furutani | 180/65.2 |
| 5,632,238 A | 5/1997 | Furukawa et al. | 123/179.3 |
| 5,698,905 A | 12/1997 | Rüthlein | 290/32 |
| 5,751,137 A | * 5/1998 | Kiuchi et al. | 322/14 |
| 5,757,153 A | 5/1998 | Ito et al. | 318/370 |
| 5,762,156 A | 6/1998 | Bates et al. | 180/165 |
| 5,771,478 A | * 6/1998 | Tsukamoto et al. | 701/68 |
| 5,839,533 A | 11/1998 | Mikami et al. | 180/165 |
| 5,841,201 A | 11/1998 | Tabata et al. | 290/40 C |
| 5,895,333 A | 4/1999 | Morisawa et al. | 475/5 |
| 5,898,282 A | * 4/1999 | Drozdz et al. | 318/139 |
| 5,927,415 A | 7/1999 | Ibaraki et al. | 180/65.2 |
| 5,941,796 A | * 8/1999 | Lee | 477/158 |
| 5,935,040 A | 10/1999 | Tabata et al. | 477/3 |
| 5,960,897 A | 10/1999 | Furuya et al. | 180/65.4 |
| 6,018,199 A | 1/2000 | Shiroyama et al. | 290/37 A |
| 6,032,753 A | 3/2000 | Yamazaki et al. | 180/65.3 |
| 6,054,776 A | 4/2000 | Sumi | 290/17 |
| 6,110,066 A | 8/2000 | Nedungadi et al. | 475/5 |
| 6,116,364 A | 9/2000 | Taguchi et al. | 180/65.3 |

FOREIGN PATENT DOCUMENTS

| | | |
|---|---|---|
| EP | 460850 A2 | * 12/1991 |
| JP | 5-322032 | 12/1993 |
| JP | 8-182109 | 7/1996 |
| JP | 9-89090 | 3/1997 |
| JP | 9-93724 | 4/1997 |
| JP | 9-191507 | 7/1997 |
| JP | 09238403 A | 9/1997 |
| JP | 10-201013 | 7/1998 |
| JP | 2000013911 | * 1/2000 |

* cited by examiner

*Primary Examiner*—Paul Ip
*Assistant Examiner*—Rina I. Duda
(74) *Attorney, Agent, or Firm*—Flynn, Thiel, Boutell & Tanis, P.C.

(57) ABSTRACT

The present invention provides a motor drive controller for a vehicle having an engine and a motor disposed therein as a vehicle-propulsion system, the motor having both driving and power-generating functions, comprising: an engine controller for controlling a running state of the engine; motor controller for controlling both driving and power-generating states of the motor in a manner independent of control over the engine gained by the engine controller; engine speed-detector for detecting an engine revolution of the engine; and, engine load-detector for detecting an engine load. The motor controller includes a map defined by respective detection signals from the engine speed detector and the engine load-detector. The motor controller functions to provide alternative control between driving and power generation of the motor in response to a torque instruction value that is retrieved from the map.

3 Claims, 9 Drawing Sheets

MOTOR DRIVE CONTROLLER FOR VEHICLE

FIELD OF THE INVENTION

The present invention relates to a motor drive controller for a vehicle and, more particular, to a motor drive controller for a vehicle providing a simplified system to further facilitate a combination of engine control and motor control.

BACKGROUND OF THE INVENTION

Some vehicles are of a type commonly called a hybrid vehicle having an internal combustion engine and an electric motor disposed therein as a propulsion system. The hybrid vehicle further includes an engine controller for controlling a running state of the engine and motor control means for controlling an operating state of the motor. The engine control means and the motor control means detect respective operating states of the engine and the motor when the vehicle is traveling, and then data on such detected running states are exchanged between the engine controller and the motor controller. As a result, the respective operating states of the engine and the motor are controlled in association with one another. Such a control system attains a high level of required performance (such as a fuel efficiency, a value of detrimental components in exhaust gases, and power performance).

One such example of a vehicle controller is disclosed in published Japanese Patent Application Laid-Open No. 9-238403. A hybrid vehicle as disclosed in this publication has an engine formed by an internal combustion engine, and further has a generator provided on the engine. When the vehicle is dampened, then operating energy of the vehicle drives the generator, thereby generating power. When the vehicle is normally traveling, then excess torque of the engine drives the generator, thereby generating power. Such generated output is stored in order to drive the generator as a motor when the vehicle is accelerated, thereby assisting the engine. The above hybrid vehicle is characterized by control means for controlling driving torque that drives the generator when the vehicle is normally traveling. Such a feature overcomes a torque deficiency that results from power generation associated with the normal traveling of the vehicle.

In a so-called hybrid vehicle controller heretofore employed, the engine control means and the motor control means detect respective operating states of the engine and the motor when a vehicle is running, and then data on such operating states are exchanged between the engine control means and the motor control means. As a result, the respective operating states of the engine and the motor are controlled in cooperation with one another.

At this time, the motor control means calculates required torque according to a detected throttle opening degree, etc., and then produces a torque instruction value for the motor after a decision is made as to how the engine shares work with the motor.

However, such a vehicle controller has the drawback of suffering from a complicated control system because the engine control means and the motor control means execute respective control in conjunction with one another.

Such a complicated control system in the controller brings about other drawbacks including reduced reliability and increased costs.

SUMMARY OF THE INVENTION

In order to overcome the above drawbacks, the present invention provides a motor drive controller for a vehicle having an engine and a motor disposed therein as the vehicle propulsion system, the motor having both a drive function and A power-generating function, comprising: an engine controller for controlling a running state of the engine; motor controller for controlling both driving and power-generating states of the motor in a manner independent of control over the engine taken by the engine control means; an engine speed detector for detecting revolution of the engine; and an engine load detector for detecting an engine load, wherein the motor controller includes a map defined by respective detection signals from the engine speed detector and the engine load detector, and wherein the motor controller provides alternative control between driving and power generation of the motor in response to a torque instruction value that is retrieved from the map.

According to the present invention as previously described, the motor controller includes the map defined by the respective detection signals from the engine speed detector and the engine load detector. In addition, the motor controller provides alternative control over between driving and power generation of the motor in response to the torque instruction value retrieved from the map. Such a construction provides a simplified system at reduced costs, and further facilitates a combination of the engine controller and the motor controller.

BRIEF DESCRIPTION OF THE DRAWINGS

Embodiments of the present invention will now be described in detail with reference to the drawings.

Figure 5:
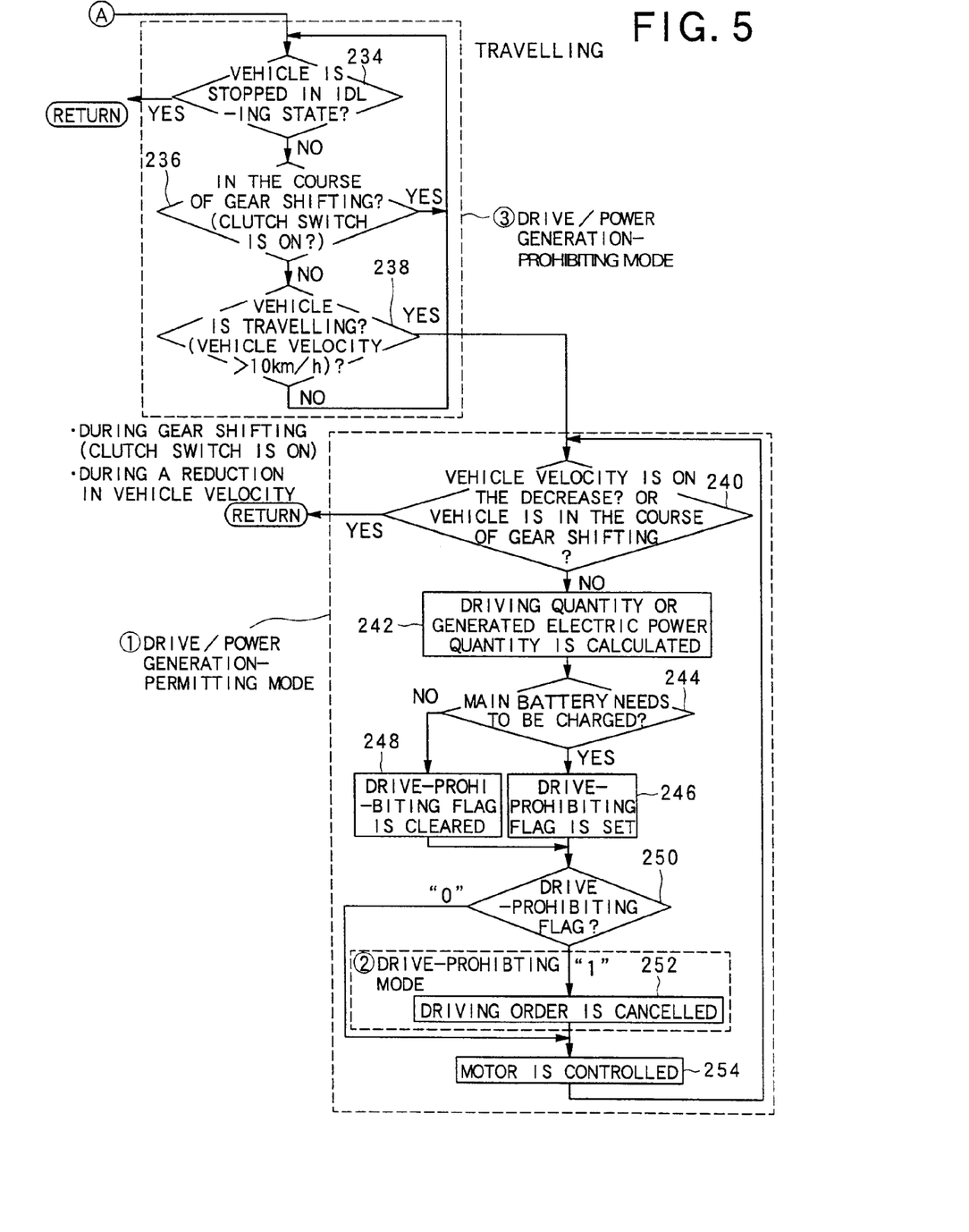
FIG. 5 is a control flowchart in a traveling control mode for use in the controller.
Figure 6:
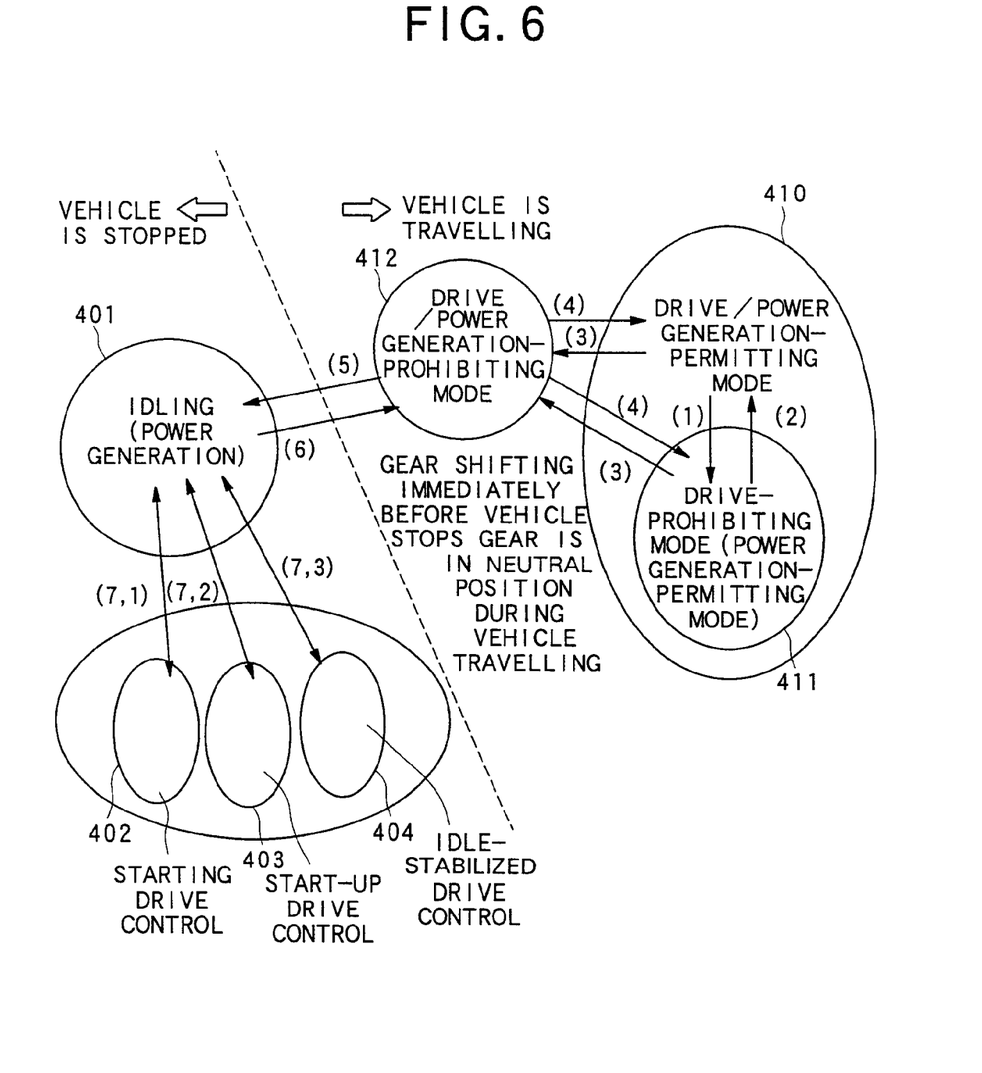
FIG. 6 is a diagram showing a control mode transition.
Figure 7:
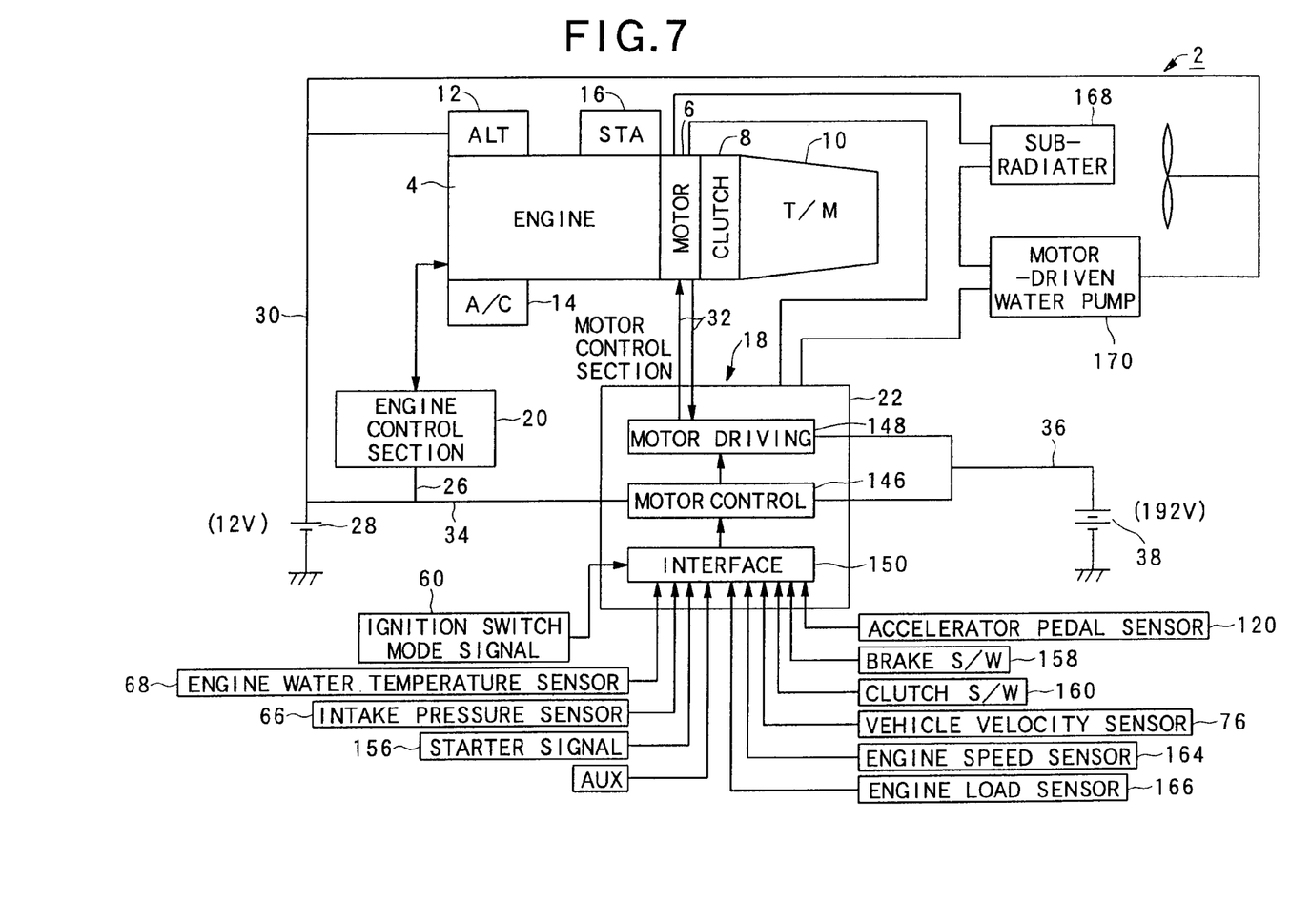
FIG. 7 is a block diagram illustrating a control system for a vehicle-propulsion system.

FIGS. 1–9 illustrate one of the embodiments of the present invention. In FIG. 7, reference numeral 2 denotes a propulsion system for a vehicle (not shown); 4 an engine (e.g. internal combustion engine); 6 an electric motor; 8 a clutch; and 10 a manually operated transmission. The vehicle has the engine 4 and the motor 6 disposed therein as the vehicle propulsion system 2. The motor 6 has both driving and power-generating functions.

The motor 6 is connected directly to the engine 4. The transmission 10 is linked to the motor 6 through the clutch 8. The engine 4 includes an alternator 12, an air-conditioner (A/C) compressor 14, and a starter motor 16.

Figure 2:
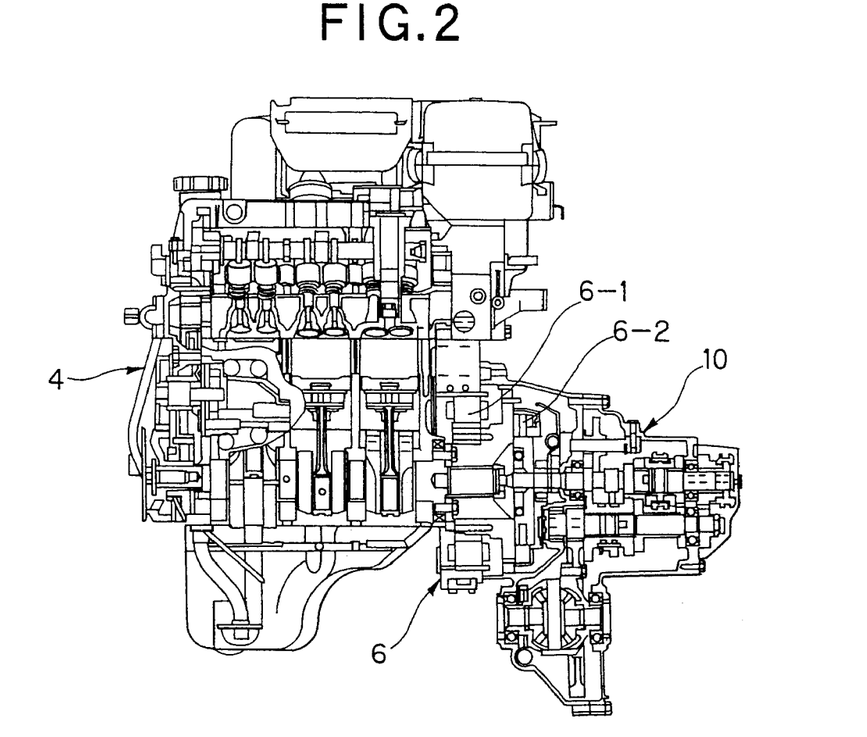
FIG. 2 is a schematic cross-sectional view of an engine.

Referring now to FIG. 2, the motor 6 is shown positioned between the engine 4 and the transmission 10. In addition, the motor 6 includes a stator coil 6-1 and a rotor 6-2 such as a flywheel.

The vehicle propulsion system 2 includes engine control means 20 and motor control means 22 as a controller 18 (FIG. 7). The engine control means 20 controls a running state of the engine 4. The motor control means 22 controls both driving and power-generating states of the motor 6.

The engine 4 is connected to the engine control means 20 though an engine-controlling signal line 24 (line herein refers to an electrical signal conduit). The engine control means 20 is linked to a sub-battery 28 through an engine control means-dedicated power line 26. The sub-battery 28 is coupled to the alternator 12 through a sub-battery-charging power line 30. The sub-battery 28 is a conventional 12 volt vehicle battery.

The motor 6 is connected to the motor control means 22 through a motor-controlling signal lines 32. The motor control means 22 is linked to the sub-battery 28 through a motor control means-dedicated sub-power line 34 and the power line 26. The motor control means 22 is also coupled to a main battery 38 through a motor control means-dedicated main power line 36. The main battery 38 supplies driving electric power to the motor 6, and is charged by generated electric power from the motor 6. Main battery 38 is a 192 volt battery for powering the motor 6.

Figure 8:
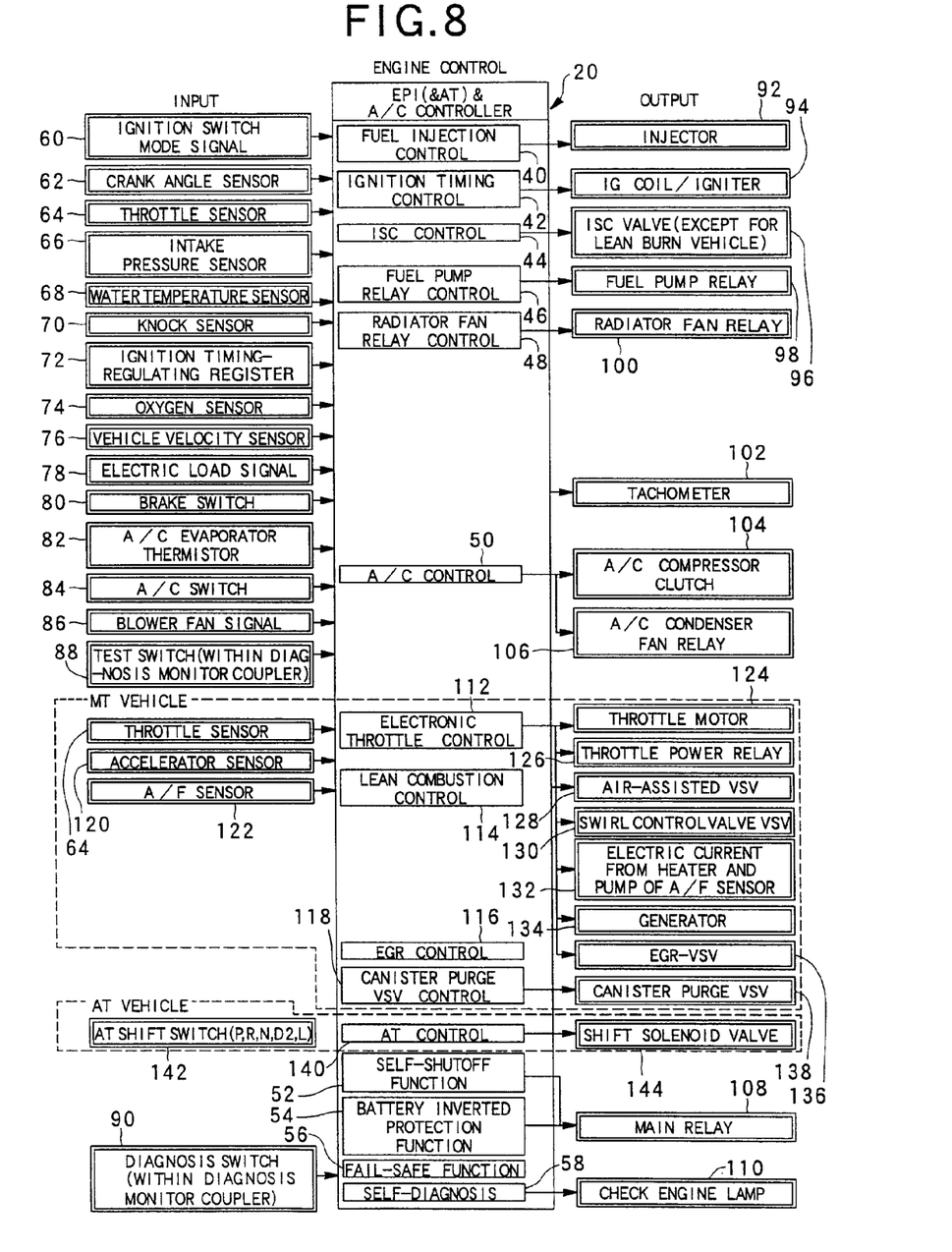
FIG. 8 is a schematic block diagram showing structure of engine controller.

As illustrated in FIG. 8, the engine control means 20 includes: a fuel injection control section 40; an ignition timing control section 42; an idle speed control (ISC) control section 44; a fuel pump relay control section 46; a radiator fan relay control section 48; an air-conditioner (A/C) control section 50; a self-shutoff function section 52; a sub-battery polarity inversion protection function section 54; a fail-safe function section 56; and a self-diagnosis section 58.

The engine control means 20 is connected at the input side to: an ignition switch 60; a crank angle sensor 62; a throttle sensor 64; an intake pressure sensor 66; a water temperature sensor 68; an engine knock sensor 70; an ignition timing-regulating register 72; an oxygen sensor 74; a vehicle velocity sensor 76; an electric load sensor 78; a brake switch 80; an A/C evaporator thermistor 82; an A/C switch 84; a blower fan 86; a test switch 88; and a diagnosis switch 90.

The engine control means 20 is linked at the output side to: an injector 92; an ignition coil/igniter 94; an ISC valve 96; a fuel pump relay 98; a radiator fan relay 100; a tachometer 102; an A/C compressor clutch 104; an A/C condenser fan relay 106; a main relay 108; and a check engine lamp 110.

When the transmission 10 is of a manually operated type, then the engine control means 20 further includes the following as enclosed by a dashed line in FIG. 8: an electronic throttle control section 112; a lean combustion control section 114; an exhaust gas recirculation (EGR) control section 116; and a canister purge valve control seciton 118. In this case, the engine control means 20 is connected at the input side to an accelerator sensor 120 and an air/fuel (A/F) sensor 122 as well as the throttle sensor 64. In addition, the engine control means 20 is linked at the output side to: a throttle motor 124; a throttle power relay 126; an air-assisted valve 128; a swirl control valve 130; a heater and pump 132 of the A/F sensor 122; a generator 134; an EGR valve 136; and, a canister purge valve 138. The EGR and canister purge valves may be vacuum switching valves.

Alternatively, when the transmission 10 is of an automatically operated type (AT), then the engine control means 20 further includes an AT control section 140 as enclosed by a dashed line in FIG. 8. In this case, the engine control means 20 is connected at the input side to an AT shift switch 142, while being linked at the output side to a shift solenoid valve 144.

The engine control means 20 drives the injector 92 and the ignitiion coil/igniter 94 in response to signals from the crank angle sensor 62 and the throttle sensor 64, thereby controlling a running state of the engine 4 such as a fuel injection quantity and ignition timing.

Figure 9:
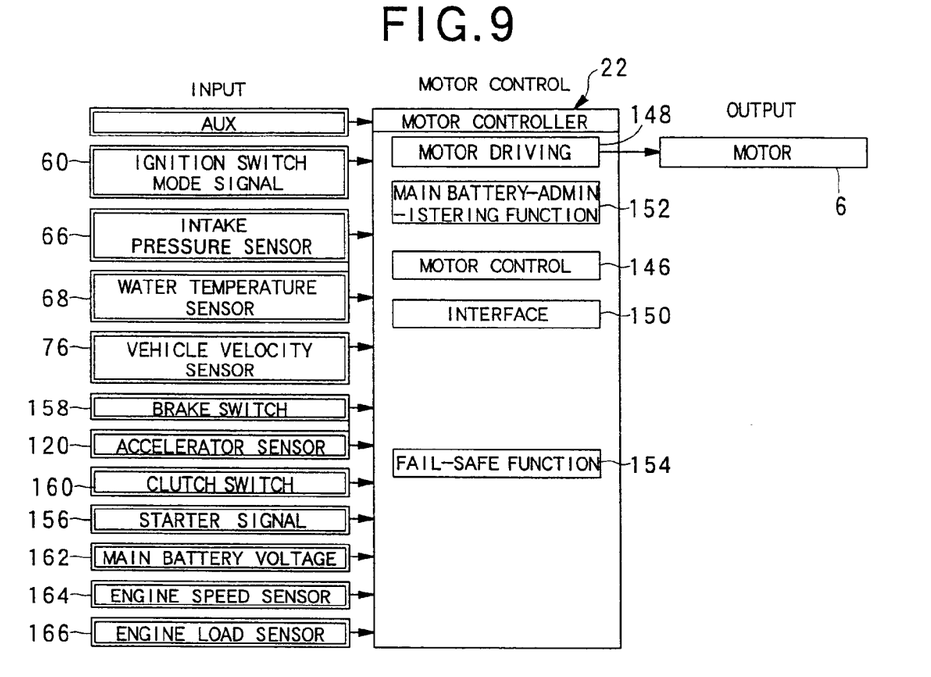
FIG. 9 is a schematic block diagram showing a structure of motor controller.

Referring to FIG. 9, the motor control means 22 is shown including a motor control section 146, a motor-driving section 148, an input/output-processing section (interface) 150, a main battery mode-administering section 152, and a fail-safe section 154.

The motor control means 22 is connected at the input side to a starter switch 156, a brake switch 158, a clutch switch 160, a main battery voltage detector 162, an engine rotational speed-detecting means or an engine speed sensor 164, and an engine load-detecting means or an engine load sensor 166, as well as the ignition switch 60, the intake pressure sensor 66, the water temperature sensor 68, the vehicle velocity sensor 76, the accelerator sensor 120. An auxiliary input is also connected to the motor control means 22.

The motor control means 22 is linked at the output side to the motor 6.

The controller 18 of the vehicle propulsion system 2 includes both of the engine control means 20 and the motor control means 22. The engine control means 20 controls an operating state of the engine 4, while the motor control means 22 controls both driving and power-generating states of the motor 6. The motor control means 22 exchanges no data with the engine control means 20. More specifically, the motor control means 22 is independent of the engine control taken by the engine control means 20, and thus independently controls and determines the driving and power-generating states of the motor 6.

As illustrated in FIG. 6, the motor control means 22 is set to a stopped control mode and a traveling control mode as a control mode based on a running state of the vehicle. In addition, the motor control means 22 is at first put into a drive/power generation-prohibiting control mode when switching over between the stopped control mode and the traveling control mode. In this way, the motor control means 22 executes control over the motor 6. The drive/generation-prohibiting control mode prohibits both driving and power generation of the motor 6.

The motor control means 22 receives a main battery voltage signal from the main battery voltage detector 162. The detector 162 detects a main battery voltage of the main battery 38. The battery 38 acts to supply driving electrical power to the motor 6 and is charged by generated electric power from the motor 6. Further, the motor control means 22 has control over the main battery mode-administering section 152 in such a manner that the administering section 152 governs a main battery mode according to the main battery voltage.

As shown in FIG. 6, the motor control means 22 when set in the stopping control mode, has an idling power generation control mode 401, a starting drive control mode 402, a start-up drive control mode 403, and an idle-stabilized drive control mode 404. When in the idling power generation control mode 401, then the motor control means 22 assumes control over the motor 6 so as to permit the motor 6 to generate power and then charge the main battery 38 therewith. When in the starting drive control mode 402, then the motor control means 22 executes control over the motor 6 so as to drive the motor 6 and then assist in starting the vehicle. In the start-up drive control mode 403, the motor control means 22 performs control over the motor 6 so as to drive the motor 6 and then assist in starting up the engine 4. In the idle-stabilized drive control mode 404, the motor control means 22 provides control over the motor 6 so as to drive the motor 6 and then stabilize idling of the engine 4.

With further reference to FIG. 6, the motor control means 22, when in the vehicle traveling control mode, has a drive/power generation-permitting control mode 410, a drive-prohibiting control mode 411, and the drive/power generation-prohibiting control mode 412. In the drive/power generation-permitting control mode, the motor control means 22 provide control over the motor 6 so as to permit both of the driving and power generation of the motor 6. In the drive-prohibiting control mode 411, the motor control means 22 executes control over the motor 6 so as to prohibit the driving of the motor 6, but permits the motor 6 to generate power. In the drive/power generation-prohibiting control mode 412, the motor control means 22 performs control over the motor 6 so as to prohibit both of the driving and power generation of the motor 6.

The motor control means 22 switches over between the above-described drive/power generation-permitting control mode and drive-prohibiting control mode according to the main battery voltage of the main battery 38 governed by the main battery mode-administering section 152 of the motor control means 22.

More specifically, when the main battery voltage is charged at 100% (SOC), then the motor control means 22 is in the drive/power generation-permitting control mode, and assumes control over the motor 6 so as to permit both of the driving and power generation of the motor 6. However, when the main battery voltage falls below a lower limit or a drive-prohibiting determination voltage, then the motor control means 22 is put into the drive-prohibiting control mode.

In the drive-prohibiting control mode, the motor control means 22 gains control over the motor 6 so as to prohibit the driving of the motor 6, but permits the motor 6 to generate power until the main battery voltage reaches a drive/power generation-permitting determination voltage. When the main battery voltage exceeds the drive/power generation-permitting determination voltage, then the motor control means 22 is turned to the drive/power generation-permitting control mode. In this mode, the motor control means 22 effects control over the motor 6 so as to permit both of the driving and power generation of the motor 6.

Such a transition from the drive/power generation-permitting control mode to the drive-prohibiting control mode is made when any one of the following transition conditions is satisfied:

(1) A main battery open-circuit voltage continues to be less than the drive-prohibiting determination voltage for a predetermined period of time;

(2) A driving main battery voltage continues to be less than a driving lower limit-determining voltage (a set value for each driving torque) for a predetermined period of time;

(3) A value obtained from the main battery open-circuit voltage minus a driving voltage is greater than a maximum voltage variation value immediately after driving (a set value for each driving torque) when a predetermined period of time elapses after the motor 6 starts driving;

(4) The main battery open-circuit voltage continues to be greater than a driving maximum voltage drop value (a set value for each driving torque) for a predetermined period of time; and, (5) The motor 6 is caused to stop its driving when a predetermined period of time elapses after the driving of the motor 6 starts, and then the main battery open-circuit voltage is detected; and the main battery open-circuit voltage continues to be less than the drive-prohibiting determination voltage (a set value for each torque) for a predetermined period of time.

In addition, when the above No. (5) condition is unsatisfied, then the motor 6 resumes its driving.

Another transition from the drive-prohibiting control mode to the drive/power generation-permitting control mode is made when any one of the following transition conditions is met:

(1) The main battery open voltage continues to be greater than the drive/power generation-permitting determination voltage for a predetermined period of time;

(2) A power-generating main battery voltage continues to be greater than a power-generating upper limit-determining voltage (a set value for each power-generating torque) for a predetermined period of time;

(3) The motor 6 is caused to stop generating power when a predetermined period of time elapses after the motor 6 starts generating power, and then the main battery open-circuit voltage is detected; and the main battery open-circuit voltage continues to be greater than the drive/power generation-permitting determination voltage for a predetermined period of time.

In addition, when a determination as to the above transitional condition No. (3) is terminated, then the motor control means 22 is put back into a control mode that was operative before such a determination is made, regardless of whether or not the above transitional condition No. (3) is met. Then, the motor control means 22 maintains such control. In addition, the time when the motor control means 22 is returned to the aforesaid control mode is newly defined as a power generation-starting time.

Figure 3:
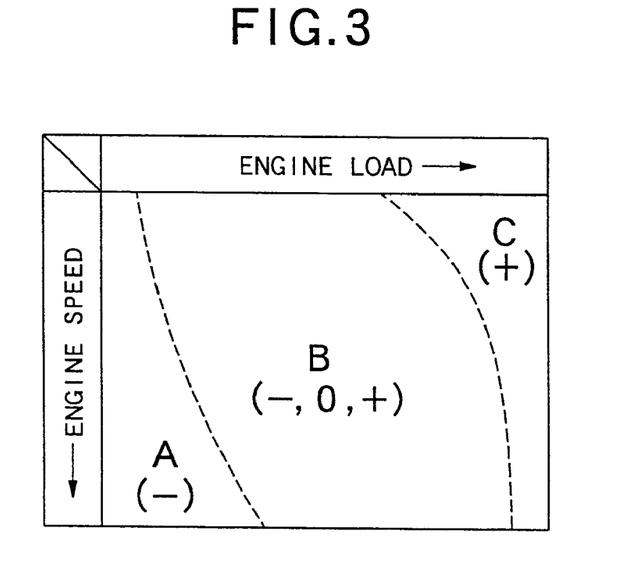
FIG. 3 is a map defined by respective detection signals from engine speed detector and engine load detector.

Moreover, the motor control means 22 is provided with a map as illustrated in FIG. 3. The map is defined by respective detection signals from the engine speed sensor 164 and the engine load sensor 166. The motor control means 22 functions to provide alternative control over between the driving and power generation of the motor 6 in response to a torque instruction value that is retrieved from the map. The map is stored in a conventional electrical or electromagnetic memory device accessible to motor control means 22.

More specifically, the motor control means 22 is connected at the input side to a group of various detection sensors for detecting a state of a power source and service environments, such as the ignition switch 60, the intake pressure sensor 66, the water temperature sensor 68, the vehicle velocity sensor 76, the accelerator sensor 120, the starter switch 156, the brake switch 158, the clutch switch 160, the main battery voltage detector 162, the engine speed sensor 164, and the engine load sensor 166. The motor control means 22 further functions to correct the retrieved torque instruction value on the basis of detection signals from such a variety of sensors, in particular, from the main battery voltage detector 162.

For example, drive instruction-starting voltage VB 1, torque-correcting voltage VB 2, and drive instruction-canceling voltage VB 3 are preset and stored in memory, and are then compared with the detection signal from the main battery voltage detector 162. Then, a decision is made as to whether it is necessary to correct the torque instruction value in a controlled manner.

In addition, the motor control means 22 has the aforesaid map provided therein for each gear position. Further, the torque instruction value according to an operating state of the engine 4 is preset in the motor control means 22.

As shown in FIG. 3, the map includes three regions that follows:

(1) "A" zone: a deceleration region (regenerative power generation);

(2) "B" zone:.a partial region (power generation, drive, neutral); and, (3) "C" zone: a full open region (drive).

In the present embodiment, the engine 4 is connected directly to the motor 6 that is positioned between the engine 4 and the manually operated transmission 10 as illustrated in FIG. 2. However, it is just acceptable that the motor 6 is merely communicates with the engine 4. Accordingly, as seen from FIG. 10, a motor 6A may be disposed in an opposite position from where the transmission 10 is connected to the engine 4 in FIG. 2. The motor 6A is connected at the side of the engine 4 remote the transmission 10. In addition, the motor 6A includes a stator coil 6A-1 and a rotor 6A-2.

Figure 10:
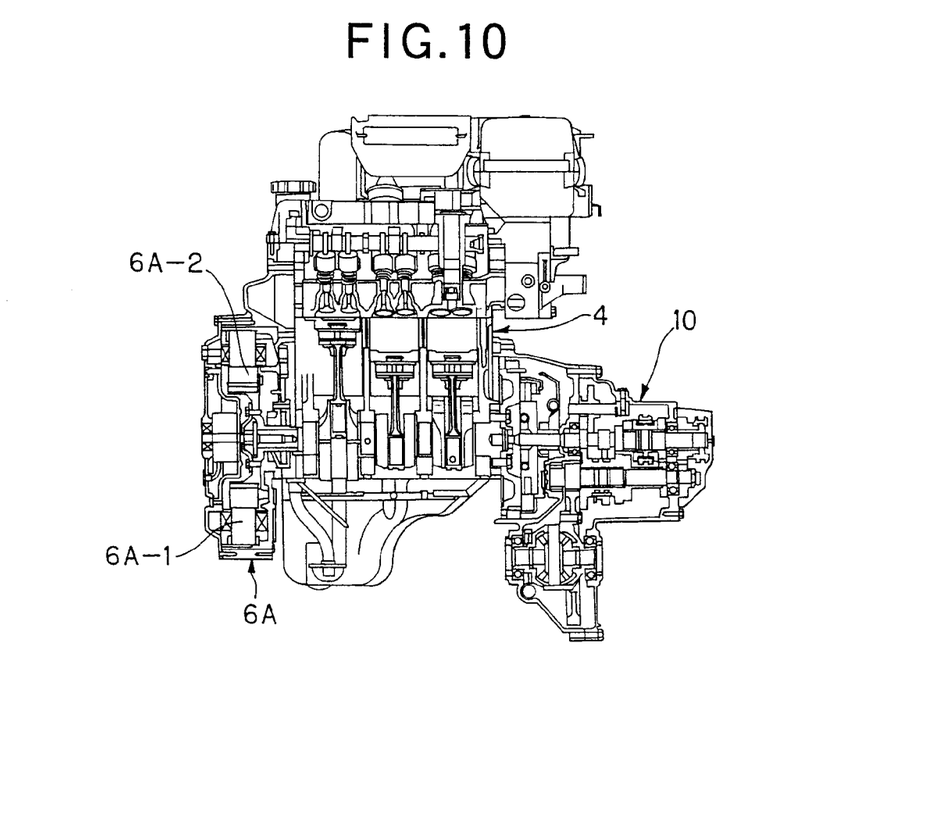
FIG. 10 is a schematic cross-sectional view of a different type of an engine; and, FIG. 11 is a map defined by respective detection signals from engine speed detector means and engine load detector according to another embodiment.

In this connection, reference numerals 168 and 170 denote a cooling sub-radiator for the motor 6 and a motor-driven water pump, respectively. The water pump 170 is driven under the control of the motor control means 22, thereby supplying the motor 6 with cooling water.

Operation of the embodiment will now be described with reference to a control flowchart in FIGS. 4 and 5 for use in the controller 18.

As shown in FIG. 6, the motor control means 22 is set in the stopping control mode or the traveling control mode as a control mode based on an operating state of a vehicle.

Figure 4:
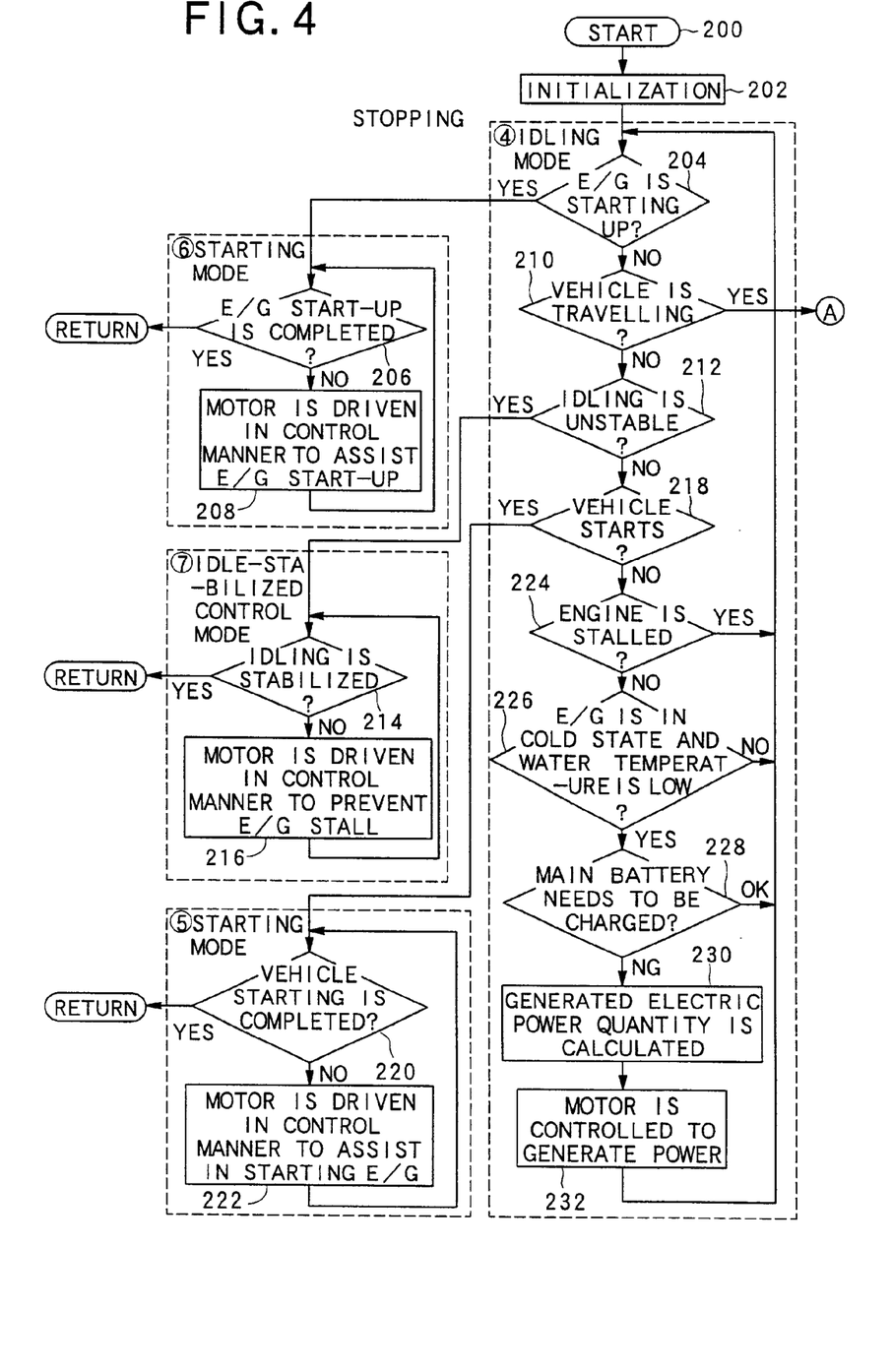
FIG. 4 is a control flowchart in a stopping control mode for use in a controller.

Referring now to FIG. 4, when the motor control means 22 in the stopping control mode it starts control at step 200, then the program is initialized at step 202. Then, a determination is made at step 204 as to whether the engine 4 is starting up.

When the determination in step 204 results in "YES", then it is determined at step 206 whether the start-up of the engine 4 has been completed. When the determination in step 206 is "YES", then the routine is returned to previous step 204. However, when the answer to the determination in step 206 is "NO", then the motor control means 22 is put into a start-up drive control mode 403. The motor control means 22 then provides control over the motor 6 at step 208 so as to drive the motor 6 and assist in starting up the engine 4. Then, the routine is returned to previous step 206.

When the determination in previous step 204 is "NO", then a determination is made at step 210 as to whether the vehicle is traveling. When the answer to the determination in step 210 is "YES", then the motor control means 22 is shifted to the traveling control mode as hereinafter described. When the determination in step 210 is "NO", then it is determined at step 212 whether engine idling is unstable.

When the determination in step 212 results in "YES", then it is determined at step 214 whether such idling has been stabilized. When the determination in step 214 is "YES", then the routine is returned to previous step 212. However, when the determination in step 214 results in "NO", then the motor control means 22 is put into the idle-stabilized drive control mode 404. The motor control means 22 then executes control over the motor 6 at step 216 so as to drive the motor 6 and then stabilize idling of the engine 4. Then, the routine is returned to previous step 214.

When the determination in previous step 212 results in "NO", then it is determined at step 218 whether the vehicle has been started. When the determination in step 218 is "YES", then a further determination is made at step 220 as to whether such vehicle starting has been completed. When the determination in step 220 is "YES", then the routine is returned to previous step 218. However, when the determination in step 220 results in "NO", then the motor control means 22 is put into a starting drive control mode 402. The motor control means 22 then effects control over the motor 6 at step 222 so as to drive the motor 6 and assist in starting the vehicle. Then, the routine is returned to previous step 220.

When the determination in previous step 218 is "NO", then it is determined at step 224 whether the engine 4 is stalled. When the determination in step 224 is "YES", then the routine is returned to previous step 204. When the determination in step 224 is "NO", then a determination is made at step 226 as to whether the engine 4 is in a cold state and a water (coolant) temperature is low.

When the answer to the determination in step 226 is "NO", then the routine is returned to previous step 204. However, when the determination in step 226 results in "YES", then it is determined at step 228 whether the main battery 38 needs to be charged.

When the determination in step 228 results in "OK" because the main battery 38 need not be charged, then the routine is returned to previous step 204. However, when the determination in step 228 is "NG" because the main battery 38 must be charged, then a quantity of generated electric power is calculated at step 230. Further, the motor 6 is controlled at step 232 so as to generate power. Then, the routine is returned to previous step 204.

When the determination in step 210 is "YES" because the vehicle is traveling, then the motor control means 22 is at first put into a drive/power generation-prohibiting control mode 412, and is then shifted to the traveling control mode as illustrated in FIG. 5. In the drive/power generation-prohibiting control mode, a determination is made at step 234 as to whether the vehicle is stopped (not moving) in an idling state.

When the determination in step 234 is "YES", then the routine is returned to previous step 210 in the idling control mode as shown in FIG. 4. When the determination in step 234 is "NO", then it is determined at step 236 whether the clutch switch 160 has been turned on (in the course of gear shifting or in a neutral position).

When the determination in step 236 is "YES", then the routine is returned to previous step 234. When the determination in step 236 is "NO", then it is determined at step 238 on the basis of a vehicle velocity signal from the vehicle velocity sensor 76 whether the vehicle is traveling. For example, step 238 determines whether vehicle velocity is less than 10 km/h.

When the determination in step 238 is "NO", the routine is returned to previous step 234. However, when the determination in step 238 is "YES", then the motor control means 22 is shifted to a drive/power generation-permitting control mode 410 in the traveling control mode. Then, a determination is made at step 240 as to whether a vehicle velocity is on the decrease or the clutch switch 160 is on (in the course of gear shifting or in a neutral position).

When the determination in step 240 is "YES", then the routine is returned to previous step 234. When the determination in step 240 results in "NO", then either a driving quantity or a quantity of generated electric power is calculated at step 242, thereby deciding on either a driving order or a power-generating order. It is then determined at step 244 whether the main battery 38 needs to be charged.

When the determination in step 244 is "YES" because the battery 38 needs to be charged, then a drive-prohibiting flag is processed at step 246 so as to be set to "1." When the determination in step 244 is "NO" because the main battery 38 need not be charged, then the drive-prohibiting flag is processed at step 248 so as to be cleared to "0."

It is then determined at step 250 whether the drive-prohibiting flag is either "1" or "0." When the answer to the determination in step 250 is "1", then the motor control means 22 is shifted to a drive-prohibiting control mode 411. When the result from previous step 242 is the driving order, then the driving order of the motor 6 is cancelled at step 252, and only the power-generating order is made effective. When the answer to the determination in step 250 is "0", then the result from previous step 242 is rendered operative. Then, the motor 6 is controlled at step 254 according to either such effective driving order or power-generating order. Thereafter, the routine is returned to previous step 240.

Figure 1:
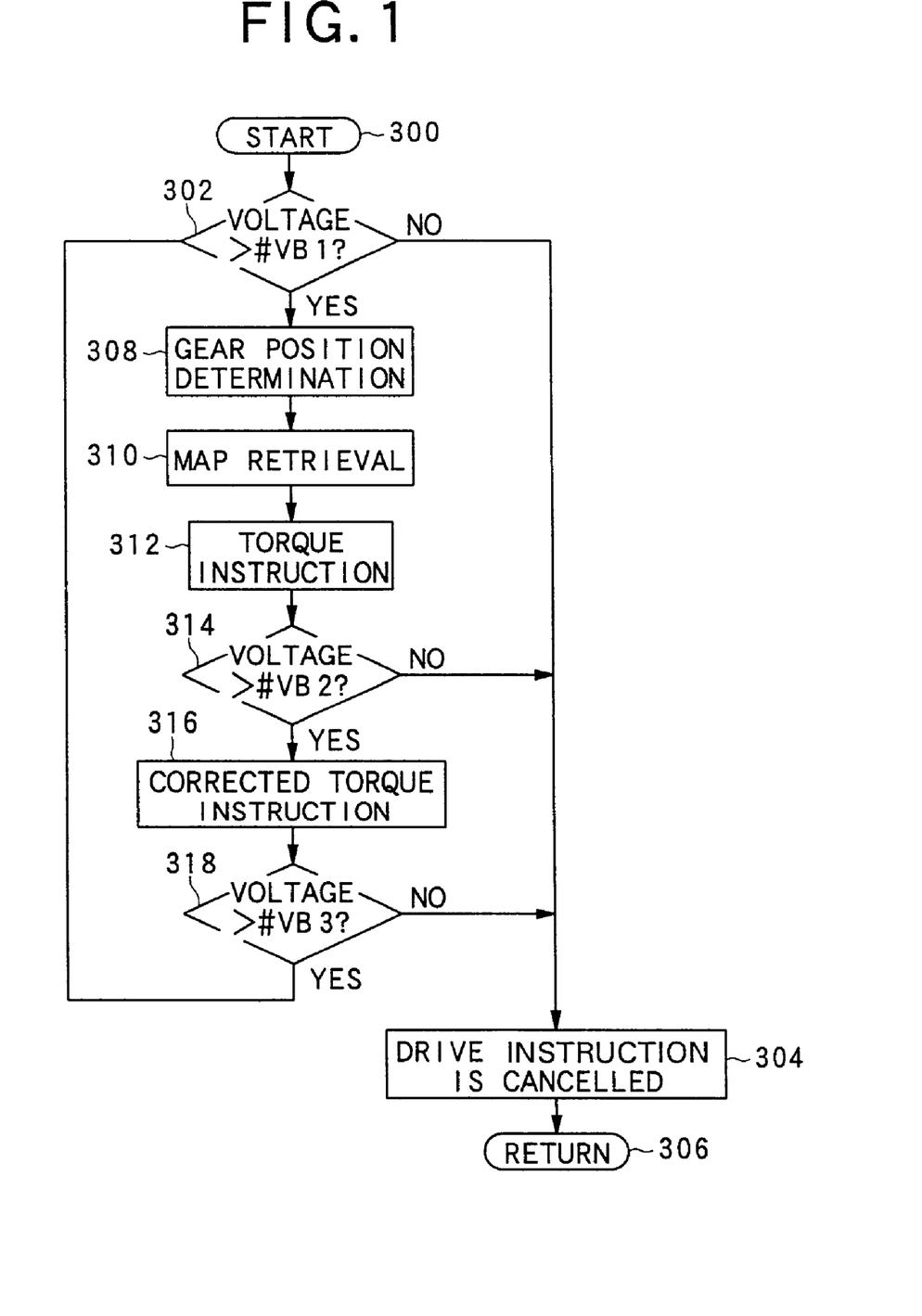
FIG. 1 is a motor drive control flowchart for use in a motor drive controller for a vehicle according to an embodiment of the present invention.

Next, further operation of the embodiment will be described with reference to a motor drive control flowchart in FIG. 1.

When the motor drive control program starts at step 300, then a determination is made at step 302 as to whether a detection signal or voltage from the main battery voltage detector 162 exceeds drive instruction-starting voltage "VB 1." When the determination in this step 302 is "NO", then the routine is shifted to step 304 at which a motor driving instruction is cancelled. The routine is then returned to step 300.

When the determination in step 302 results in "YES", then a gear position is determined at step 308. At subsequent step 310, motor control means retrieves instruction value from a map. That is, a torque instruction value retrieved from the map is performed at step 312.

The determination in step 308 can be made using either a detection signal from a gear position sensor (not shown) or a signal indicative of a gear position calculated by an arithmetic operation. The gear position sensor (not shown) is positioned for sensing each gear position.

After the above step 312, it is determined at step 314 whether the detection signal or the voltage from the main battery voltage detector 162 exceeds torque-correcting voltage "VB 2." When the answer to the determination in step 314 is "NO", then the routine is shifted to step 304 at which the drive instruction is cancelled, and the routine is then returned to step 300. However, when the determination in step 314 results in "YES", then a torque correction instruction is issued. More specifically, a torque instruction value is corrected according to a running state of the engine 4, and the corrected torque instruction value is produced at step 316.

After step 316, a determination is made at step 318 as to whether the detection signal or the voltage from the main battery voltage detector 162 exceeds drive instruction-canceling voltage "VB 3." When the answer to the determination in step 318 is "NO", then the routine is shifted to step 304 at which the drive instruction is cancelled, and is then returned to step 300. However, when the determination in step 318 is "YES", then the routine is returned to the previous step 308.

The motor control means 22 includes the map defined by respective detection signals from the engine speed detecting sensor and the engine load detecting sensor. Further, the motor control means 22 serves to drive the motor 6 in a controlled manner in response to the torque instruction value that is retrieved from the map. As a result, the torque instruction value is of a preset type. In addition, complicated arithmetic operation such as required torque or a partial charge ratio need not be performed. Further, a simplified system is attainable at reduced costs, which is advantageous from an economical viewpoint.

In the controller 18 of the vehicle-propulsion system 2, the two control systems, namely the engine control means 20 and the motor control means 22, are independent of one another. Such independent controllers facilitates any selected combination of the engine control means 20 and the motor control means 22, with a consequential increase in versatility. This is advantageous in view of practical use and construction of hybrid vehicle propulsion systems.

In addition, the motor control means 22 functions to permit the torque instruction value retrieved from the map to be corrected according to detection signals from a group of the various sensors, in particular, from the main battery voltage detector 162. As a result, the motor control means 22 enables control in response to variations in voltage of the main battery 38, and thus provides improved reliability of control.

Moreover, the motor control means 22 include a map for each gear position, and further has the torque instruction value according to a running state of the engine 4 preset in the motor control means 22. As a result, with the motor control means 22 it is possible to cope with any running state of the engine 4, thereby providing enhanced convenience of use. In this connection, the torque instruction values taking "a positive value", "zero", and "a negative value" are stored in one map (FIG. 3).

The present invention is not limited to the above, but is susceptible to various applications, changes, and modifications.

For example, the map according to the present embodiment is defined by the respective detection signals from the engine speed sensor and the engine load sensor, and includes the following regions:

(1) "A" zone: a deceleration region (regenerative power generation);

(2) "B" zone: a partial region (power generation, drive, neutral); and, (3) "C" zone: a full open region (drive).

Figure 11:
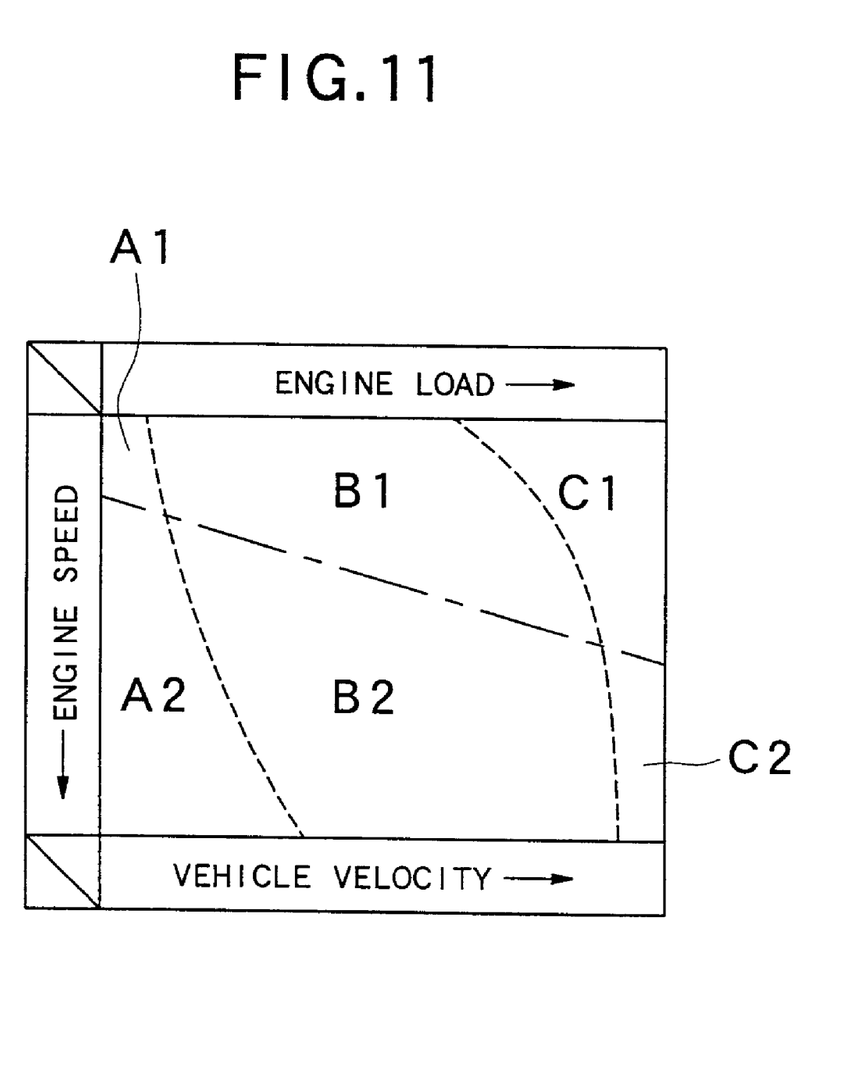

As illustrated by a dashed line in FIG. 11, the map may further be divided according to a vehicle velocity, and is thereby specially structured to provide a subdivided map.

More specifically, as shown in FIG. 11, the map is further divided according to the vehicle velocity, and is thereby subdivided into the following regions:

(1) "A1", "A2" zones: a deceleration region (regenerative power generation);

(2) "B1", "B2" zones: a partial region (power generation, drive, neutral); and, (3) "C1", "C2" zones: a full open region (drive).

This system makes it feasible to provide a map defined by the engine speed, the engine load, and the vehicle velocity, and thus to provide a torque instruction value indicative of a real state of the vehicle. As a result, more precise control and thus improved control reliability are achievable.

In addition, the map according to the present embodiment is divided into three regions in such a manner that the engine speed is varied with reference to the engine load. Alternatively, a specially structured map, i.e., a schematic map defined only by the engine load, may be employed. The schematic map is designed to provide simplified arithmetic operation control when the torque instruction value is calculated.

With such a simpler map, it is only necessary to calculate the torque instruction value from the schematic map according to the engine load, and thereafter to correct the calculated torque instruction value in a controlled manner on the basis of detection signals, for example the engine speed or the voltage, when desired. As a result, the schematic map provides simplified arithmetic operation control in calculating the torque instruction value, and thus improves response.

As amplified in the above description, the present invention provides a motor drive controller for a vehicle having an internal combustion (main) engine and an electric (auxiliary) motor disposed therein as a vehicle-propulsion system. The motor has both driving and power-generating functions and comprises: engine control means for controlling a running state of the engine; motor control means for controlling both driving and power-generating states of the motor in a manner independent of control over the engine taken by the engine control means; engine speed-detecting means for detecting an engine revolution of the engine; and engine load-detecting means for detecting an engine load. The motor control means includes a map defined by respective detection signals from the engine speed-detecting means and the engine load-detecting means. The motor control means functions to provide alternative control between driving and power generation of the motor in response to a torque instruction value that is retrieved from the map. As a result, a simplified system is achievable at reduced costs, which is advantageous from an economic viewpoint. In addition, the vehicle-propulsion system having the motor control means operated independently of the engine control means readily provides any selected combination of the engine control means and the motor control means. Such a feature results in increased versatility, which is advantageous in view of practical use.

Although a particular preferred embodiments of the invention has been disclosed in detail for illustrative purposes, it will be recognized that variations or modifications of the disclosed apparatus, including the rearrangement of parts, lie within the scope of the present invention.

The invention claimed is:

1. A motor drive controller for a vehicle having an engine and an electrical motor disposed therein as a vehicle propulsion system, the motor having both driving and power-generating functions, comprising: an engine controller for controlling a running state of the engine; a motor controller for controlling both a drive state and a power generation state of the motor independent from control of the engine by the engine controller; an engine speed-detector for detecting revolutions of the engine; and an engine load-detector for detecting load of the engine, the motor controller including a map defined by respective detection signals from the engine speed-detector and the engine load-detector, and the motor controller providing alternative control between driving and power generation of the motor in response to a torque instruction value preset in the motor controller that is retrieved from the map, wherein the map is one of a plurality of maps, one of the maps being provided therein for each gear position.

2. A motor drive controller according to claim 1, wherein the motor controller is connected to a group of detection sensors for detecting a state of a power source and service environments, and wherein the motor controller enables a torque instruction value retrieved from the map to be corrected on the basis of detection signals from the sensors.

3. A motor drive controller for a vehicle having an engine and an electrical motor disposed therein as a vehicle propulsion system, the motor having both driving and power-generating functions, comprising: an engine controller for controlling a running state of the engine; a motor controller for controlling both a drive state and a power-generation state of the motor independent from control of the engine by the engine controller; an engine speed-detector for detecting revolutions of the engine; and an engine load-detector for detecting load of the engine, the motor controller including a map defined by respective detection signals from the engine speed-detector and the engine load-detector, and the motor controller providing alternative control between driving and power generation of the motor in response to a torque instruction value that is retrieved from the map, wherein the map defined by the respective detection signals from the engine speed-detector and the engine load-detector is further divided according to a vehicle velocity, thereby providing a subdivided map.

* * * * *